April 14, 1925.
S. SMITH
GUARD FOR AUTOMOBILES
Filed Dec. 19, 1924
1,533,214
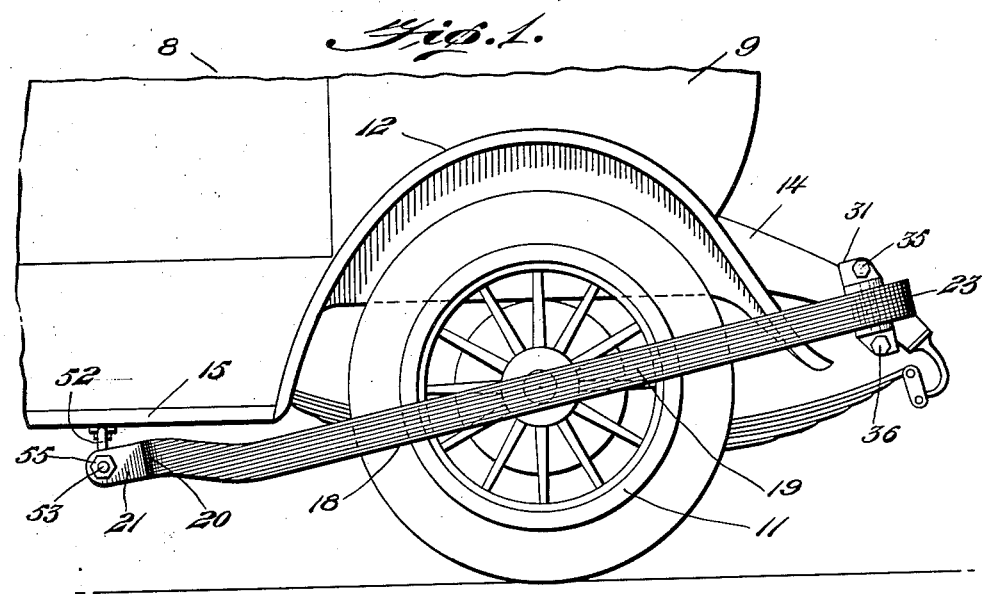
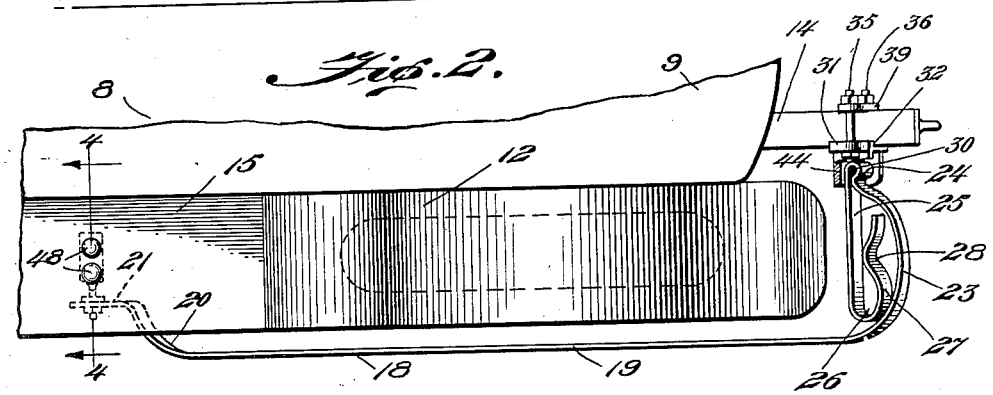
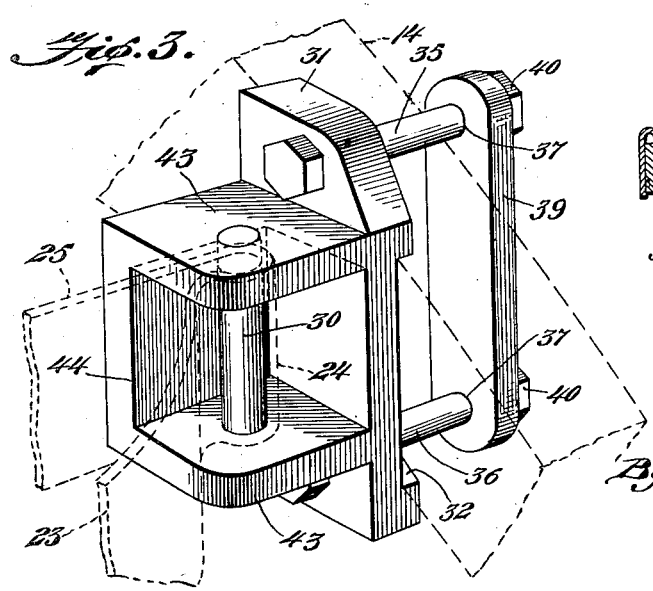
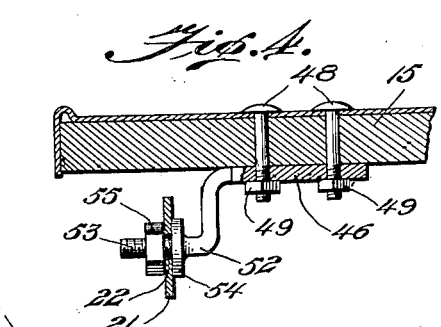
Inventor
Sheffield Smith
By Horatio E. Bellows
Attorney Patented Apr. 14, 1925.

1,533,214

UNITED STATES PATENT OFFICE.

SHEFFIELD SMITH, OF NORTH PROVIDENCE, RHODE ISLAND.

GUARD FOR AUTOMOBILES.

Application filed December 19, 1924. Serial No. 756,928.

*To all whom it may concern:*

Be it known that I, SHEFFIELD SMITH, a citizen of the United States, residing at North Providence, in the county of Providence and State of Rhode Island, have invented certain new and useful Improvements in Guards for Automobiles, of which the following is a specification.

My invention relates to side guards for automobiles adapted primarily for the protection of the wheels and fenders.

The essential objects of my invention are to guard the wheel and fender from blows from every direction; to effectively prevent any resultant shock upon the automobile; and to attain these ends in an inexpensive structure free from any points, angles or projections, and readily attachable to an automobile, as well as capable of affording accessibility to the wheel when desired.

To the above ends essentially, but not exclusively, my invention consists in such parts and in such combinations of parts as fall within the scope of the appended claims.

In the accompanying drawings illustrating the principle of my invention and the best mode now known to me of applying that principle—

Figure 1 is a front elevation of my device applied to an automobile,

Figure 2, a fragmentary plant view of the same,

Figure 3, a perspective view of one of the guard supports, and

Figure 4, a fragmentary section on line 4—4 of Figure 2.

Like reference characters indicated like parts throughout the views.

In the drawings 8 represents the rear portion of an automobile of any usual or preferred construction including the body 9, the rear wheels 11, the fenders 12, and the chassis including such chassis parts as the spring support 14 and the running board 15. In conjunction with these familiar parts the use of my device is herein illustrated.

My guard consists of a flat resilient metal rod 18 comprising a substantially straight or slightly convexed intermediate portion 19 horizontally disposed adjacent the rear wheel axle and fender, also an inwardly directed horizontally disposed forward portion 20 having a forwardly directed extremity 21 provided with a hole 22 adapted to receive an attaching member. Integral with the intermediate portion of the guard, at its rear end, is an inwardly directed arched portion 23 enclosing the rear of the wheel and fender. The portions 19, 20, 21, and 23 constitute the body of the guard and form an integral unit of a somewhat resilient character. The material of the rod at the inner end of the arched portion 23 is formed into a rearwardly directed, horizontal circular or semi-open loop 24, with a straight resilient arm 25 extending outwardly therefrom, at whose free end the material of the rod is bent into an open loop 26, forming an inwardly directed finger 27 extending between the arm 25 and the arched portion 23, provided in this instance intermediate its length with a bend 28 directed towards the arm 25. The bent finger 27 is adjacent to but spaced from the arched portion 23.

The rear end of the guard may be retained in position by a pin 30 fixed to or carried by the chassis and embraced by the loop 24. In this instance the attaching means includes a vertical attaching or clamping plate 31 provided on its rear face with a diagonally disposed channel 32 adapted to receive the outer side of the chassis portion 14, and is perforated at its top and bottom to receive the bolts 35 and 36 extending transversely of the top and bottom of the member 14 and passing through perforations 37 in a clamping plate 39 retained against the inner face of the member 14 by nuts 40. Integral with the outer face of the plate 31 are parallel horizontal lateral lugs or plates 43 spaced from each other and connected at their forward lateral edges by a wall or abutment 44. The pin 30 is fixed in the lugs 43 adjacent the abutment 44. In Figure 3 the described attaching means is shown in full lines, and fragments of the members 14 and of 23, 24, and 25 are shown in broken lines.

The forward end of the guard 18 may be attached to the running board 15 in any convenient manner. In the present instance a plate 46 is fixed to the board by bolts 48 and nuts 49. Upon the end of the plate is a bent arm 52 provided with a threaded end 53 and an intermediate annular shoulder 54. The arm passes loosely through the perforation 22 and the portion 21 of the guard is clamped against the shoulder 54 by a nut 55 on the threaded end of the arm.

Access to the wheel is effected when desired by removing the nut 55 from the arm 52 and swinging the guard 18 rearwardly upon the pin 30.

It will be observed that the outer faces of the wheel and fender are protected by the portion 19 of the resilient guard, which is cushioned by the spring loop 26 when the blow is sufficiently strong to force the part 19 into contact with the latter. A blow from the rear is first opposed by the resilient arched portion 23 of the guard, but if the blow is more powerful the latter is brought into contact with the finger 27 and is cushioned thereby, and by the arm 25. It will be noted further that if this blow is very powerful the arm 25 will contact with the abutment 44 thereby relatively advancing the arm toward the arch and thereby increasing the mutual resistance of all the spring elements.

The integral unbroken and curved character of the guard tends to divert an object contacting therewith.

Other modes of applying the principle of my invention may be employed instead of the one explained, change being made as regards the construction herein disclosed, provided the means stated by any of the following claims or the equivalent of such stated means be employed.

I claim:—

1. In combination with the chassis, wheel, and fender, of an automobile, a side guard comprising in one integral resilient structure an intermediate portion extending outside the wheel and fender, an inwardly directed forward portion detachably engaging the chassis at a point forward of the wheel and fender, and an inwardly directed arched portion pivotally secured to the chassis in the rear of the wheel and fender.

2. In combination with the chassis, wheel, and fender of an automobile, a pin supported by the chassis in the rear of the wheel and fender, a guard attached at one end to the chassis forwardly of the wheel and fender and comprising a resilient arched portion provided with an end loop embracing the pin, and resilient cushioning means carried by the loop extending into the arched portion to cooperate with the guard.

3. In combination with the chassis, wheel, and fender of an automobile, a pin carried by the chassis in the rear of the wheel and fender, a guard connected at one end with the chassis and extending transversely across the wheel including an inwardly directed arched portion, a loop upon the inner end of the arched portion embracing the pin, and an auxiliary spring arm upon the loop in the plane of the guard.

4. In combination with the chassis, wheel, and fender of an automobile, a pin carried by the chassis in the rear of the wheel and fender, a guard connected at one end with the chassis and extending transversely across the wheel including an inwardly directed arched portion, a loop upon the inner end of the arched portion embracing the pin, an auxiliary spring arm upon the loop in the plane of the guard, and a loop upon the end of the arm adjacent the guard.

5. In combination with the chassis, wheel, and fender of an automobile, a pin carried by the chassis in the rear of the wheel and fender, a guard attached to the chassis forwardly of the wheel and fender and extending transversely outside the wheel and including an inwardly directed arched portion, a loop upon the inner end of the arched portion engaging the pin, an outwardly directed resilient arm upon the loop, a loop upon the end of the arm, and an inwardly directed finger upon the second loop adjacent the arched portion of the guard.

6. In combination with the chassis, wheel and fender of an automobile, a pin carried by the chassis in the rear of the wheel and fender, a guard disposed outside the fender and transversely thereof attached at its forward end to the chassis and including an arched portion enclosing the wheel and fender, a loop upon the inner end of the arched portion engaging the pin, an outwardly directed finger upon the loop, a loop upon the free end of the arm adjacent the guard, and an inwardly directed finger upon the second loop provided with an intermediate bend and disposed in the plane of the guard and adjacent the arched portion.

7. In combination with the chassis, wheel, and fender of an automobile, a side guard comprising an intermediate portion extending longitudinally of the wheel and fender, an inwardly directed forward portion attached to the chassis forwardly of the wheel and fender, and an inwardly directed arched portion enclosing the rear of the wheel and fender attached to the chassis, an outwardly directed resilient arm supported by the chassis at the point of attachment of the arched portion, a loop on the arm adjacent the intermediate portion of the guard, and a finger on the loop adjacent the arched portion of the guard.

8. In combination with the chassis, wheel, and fender of an automobile, a side guard comprising an intermediate portion outside the wheel, a forward portion engaging the chassis forwardly of the wheel, and an arched portion enclosing the rear of the wheel and fender, a supporting member carried by the chassis, a pin upon the supporting member, an abutment upon the member adjacent the pin, a loop upon the arched portion engaging the pin, and an outwardly directed arm upon the loop adjacent the abutment.

In testimony whereof I have affixed my signature.

SHEFFIELD SMITH.